United States Patent [19]
Ting et al.

[11] Patent Number: 5,917,093
[45] Date of Patent: Jun. 29, 1999

[54] PURIFICATION OF α-ACIDS AND β-ACIDS

[75] Inventors: Patrick L. Ting, Brookfield; Jay R. Refling, Milwaukee; Michael A. VanSanford, Wales; Henry Goldstein, Brookfield, all of Wis.

[73] Assignee: Miller Brewing Company, Milwaukee, Wis.

[21] Appl. No.: 08/970,062

[22] Filed: Nov. 13, 1997

[51] Int. Cl.$^6$ ................................................ C07C 45/78
[52] U.S. Cl. ........................ 568/366; 568/350; 568/347; 568/377; 568/341; 426/600
[58] Field of Search ............................ 568/366, 350, 568/347, 341, 377; 426/600

[56] References Cited

U.S. PATENT DOCUMENTS 4,013,721  3/1977  Reininger et al. .
4,590,296  5/1986  Cowles et al. .
4,644,084  2/1987  Cowles et al. .
4,778,691  10/1988  Todd, Jr. et al. .
4,918,240  4/1990  Todd, Jr. et al. .

OTHER PUBLICATIONS

Energy Reserach Abstract, 16(7), Abstract # 16052, 1991.
D. Hairston, "Activated Carbon Gets Revved Up," *Chemical Engineering* pp. 75, 76, 78, 1995.

*Primary Examiner*—Gary Geist
*Assistant Examiner*—Sreeni Padmanabhan
*Attorney, Agent, or Firm*—Quarles & Brady LLP

[57] ABSTRACT

Unsaturated organic compounds, in particular α-acids and β-acids, are purified prior to hydrogenation by mixing them with an adsorbent capable of adsorbing catalyst poisons, preferably activated carbon, and separating the adsorbent containing the catalyst poisons to recover the thus purified unsaturated organic compounds. A significant reduction in the use of hydrogenation catalyst is realized.

13 Claims, 1 Drawing Sheet

PURIFICATION OF α-ACIDS AND β-ACIDS

BACKGROUND OF THE INVENTION

1. Field of the Invention

This invention relates generally to the hydrogenation of unsaturated organic compounds, and especially to the hydrogenation of α-acids and the hydrogenation/hydrogenolysis of β-acids. More specifically, it relates to the purification of α-acids and β-acids by removing catalyst poisons so that the hydrogenation reaction is more efficient and economical.

2. Background of the Art

Catalyst poisoning is a common and vexing problem with noble-metal catalysts which are used in a variety of industrial settings. Catalyst poisoning can cause difficulties such as higher catalyst loadings or reaction failures which result in higher operating costs. The problem of catalyst poisoning extends to processes for hydrogenating α-acids and β-acids.

We have not identified the catalyst poisoning compounds present in hop extracts, but we believe some sulfur compounds (especially disulfides) are in the hop oil fraction and are responsible for deactivation of the catalyst. One approach for minimizing the presence of catalyst deactivation compounds is the use of an organic solvent-free process for the separation and purification of α-acids and β-acids from the hop oil fraction in hop extracts. See U.S. Pat. Nos. 4,590,296 and 4,644,084. The hydrogenation/hydrogenolysis of unpurified β-acids from such a process typically requires a 10% loading for a 5% Pd/C catalyst based on the feed material. However, when hexane (or other organic solvent)-recrystallized β-acids are used as feed material the same catalyst can be used at a 1–2% loading. Thus, such improvement in the purity of organic solvent-free β-acids which further reduces catalyst poisons is highly desirable. Because catalysts are a very expensive commodity, a reduction in their use results in significant savings.

Efforts have been made to remove the catalyst poisons by further purification of β-acids prior to the hydrogenation/hydrogenolysis reactions. For example, U.S. Pat. No. 4,918,240 discloses that β-acids, separated from hop extracts, can be purified prior to hydrogenolysis by mixing with an aqueous solution of polyvalent metal ions, separating the aqueous β-acids from insoluble materials containing the catalyst poisons, and recovering the thus purified β-acids which are catalyst-poison free and in a form suitable for hydrogenolysis to tetrahydro-4-desoxy-α-acids. However, this method is tedious (including pH control and multiple treatments with divalent salts), time consuming, and uses organic solvents.

Thus, it would be advantageous to have a relatively simple process of removing catalyst poisons from the α-acid and β-acid streams so that the hydrogenation reaction is more efficient and economical.

BRIEF SUMMARY OF THE INVENTION

We have discovered a novel method of removing catalyst poisons from unsaturated organic compounds. This method uses an adsorbent such as activated carbon and is relatively simple and economical. After such treatment, less catalyst is required to hydrogenate the unsaturated organic compounds.

One aspect of the invention provides a method for the removal of catalyst poisons from unsaturated organic compounds comprising the steps of: agitating an aqueous solution of the unsaturated organic compounds in the presence of an adsorbent capable of adsorbing the catalyst poisons; and separating the adsorbent containing the catalyst poisons from the aqueous solution of unsaturated organic compounds. The unsaturated organic compounds can be hop extract derivatives such as α-acids and β-acids.

The adsorbent is preferably selected from the group consisting of silica, diatomaceous earth, alumina, zeolite, and activated carbon. Most preferably the adsorbent is activated carbon.

The method can include the further step of hydrogenating the unsaturated organic compounds. If the unsaturated compound is an α-acid, then the further step would include isomerization/hydrogenation to produce tetrahydroiso-α-acids. If the unsaturated compound is a β-acid, then the further step would include hydrogenation/hydrogenolysis to produce tetrahydrodesoxy-α-acids.

Another aspect of the invention provides purified beta acids substantially free of catalyst poisons which have been removed by agitating an aqueous solution of the beta acids containing the catalyst poisons with an adsorbent capable of adsorbing the catalyst poisons. The adsorbent is preferably selected from the group consisting of silica, diatomaceous earth, alumina, zeolite, and activated carbon. Most preferably the adsorbent is activated carbon.

A still further aspect of the invention provides purified alpha acids substantially free of catalyst poisons which have been removed by agitating an aqueous solution of the alpha acids containing the catalyst poisons with an adsorbent capable of adsorbing the catalyst poisons. The adsorbent is preferably selected from the group consisting of silica, diatomaceous earth, alumina, zeolite, and activated carbon. Most preferably the adsorbent is activated carbon.

The objects of the invention, therefore, include providing a method of the above kind:

(a) which uses an inexpensive adsorbent to remove catalyst poisons from unsaturated organic compounds;

(b) which requires less catalyst loading when the unsaturated organic compound is subsequently hydrogenated;

(c) which avoids the use of organic solvents in the catalyst poison removal process; and (d) which is simple and economical to use.

These and still other objects and advantages of the present invention will be apparent from the description below. However, this description is only of the preferred embodiments. The claims should, therefore, be looked to in order to assess the whole scope of the invention.

DETAILED DESCRIPTION OF THE INVENTION

Figure 1:
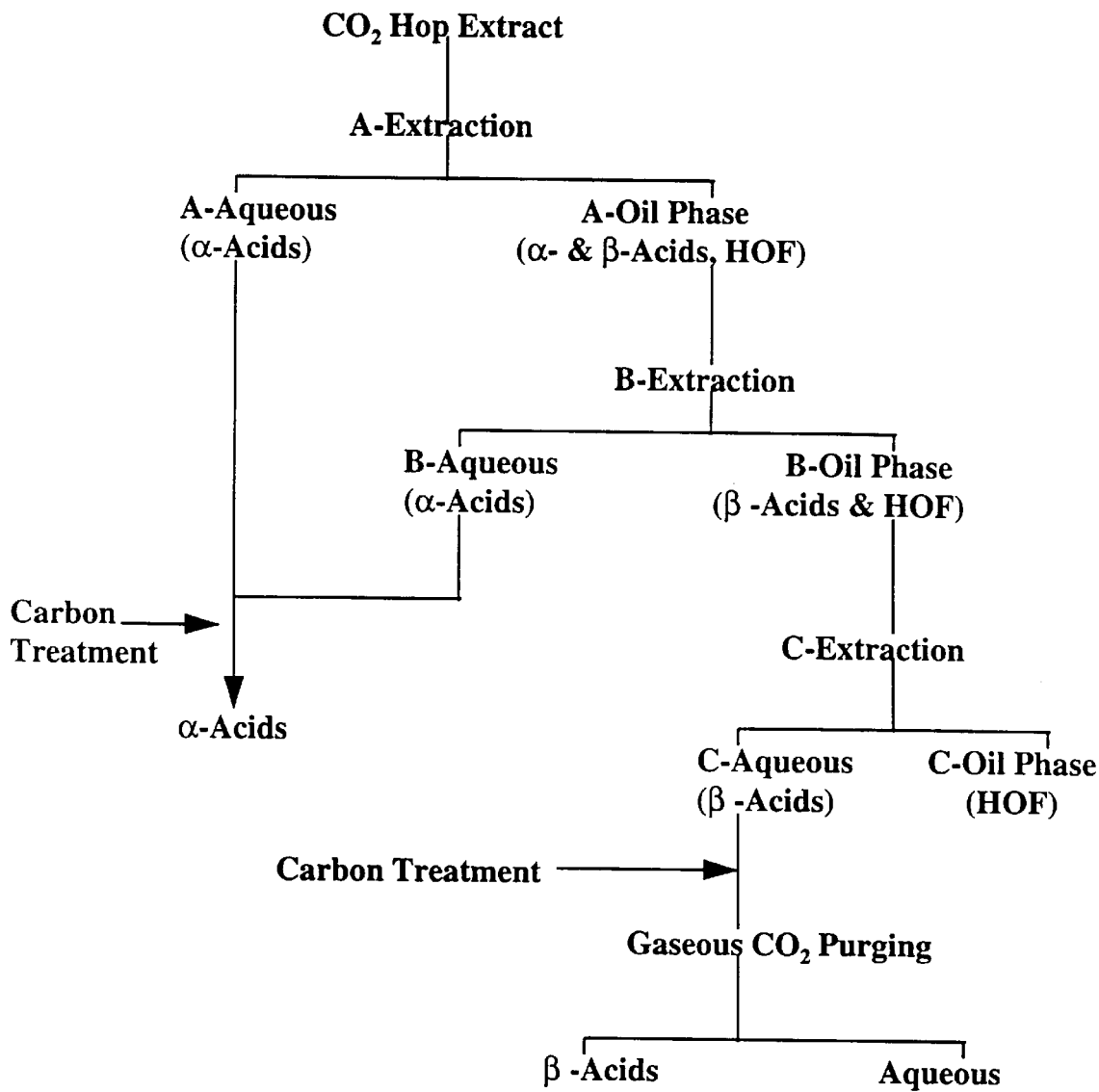
FIG. 1 is a diagram showing a separation scheme for hop extracts.

Various post-kettle bittering agents such as iso-α-acids, ρ-iso-α-acids, tetrahydroiso-α-acids, and hop oil fraction can be produced for different brewing purposes. Starting from a $CO_2$ hop extract, the α-acids and β-acids are prepared by a subsequent caustic extraction into an A/B-aqueous stream (containing α-acids) and a C-aqueous stream (containing β-acids) leaving the hop oil fraction (HOF) behind as an oily phase. See FIG. 1. The A/B-aqueous stream can be isomerized to iso-α-acids, isomerized/reduced to ρ-iso-α-acids using sodium borohydride, and isomerized/hydrogenated to tetrahydroiso-α-acids. The C-aqueous stream is precipitated by purging it with gaseous $CO_2$ to separate the white/light yellow β-acids. The $CO_2$ precipitated β-acids are hydrogenated to tetrahydrodesoxy α-acids and then oxidized/isomerized to tetrahydroiso-α-acids.

As discussed above, the hydrogenation/hydrogenolysis process typically employs 10% (w/w) catalyst loading when using unpurified β-acids compared to a 1–2% loading when using hexane-recrystallized pure β-acids. The excess catalyst is needed to overcome catalyst poison compounds which remain in the $CO_2$ precipitated β-acids. Significant cost savings can be realized when the use of catalyst is reduced. Catalyst recycling is one way to cut cost. However, catalyst recycling is not always successful when the catalyst poisons are present in the feed material. Extensive purification of feed materials to reduce catalyst poisons is one alternative but this is also costly.

We have discovered a relatively simple and economical method for the purification of hop extracts which uses activated carbon. The treatment with activated carbon resulted in a significant reduction of catalyst usage for the hydrogenation/hydrogenolysis of α-acids and β-acids. Activated carbon is mostly used in water treatment to remove organics. Thus, in our α/β-acids separation process, the A/B-aqueous stream and the C-aqueous stream can be purified by activated carbon because the water soluble α/β-acids salts have no affinity for the activated carbon. The following experiments illustrate this point.

Starting with a $CO_2$ hop extract, the A/B aqueous stream and the C-aqueous stream were prepared by the extractive process shown in FIG. 1. The C-aqueous stream was divided into two parts: one part (1200–1750 ml) was treated with activated carbon (40–100 g) and the other part was not (it served as a control). The two streams were subjected to $CO_2$ precipitation and filtration to produce the β-acids feed materials. The β-acids were then subjected to hydrogenation/hydrogenolysis to produce tetrahydrodesoxy-α-acids. Two catalysts, designated catalysts "A" and "B" were used for the reaction. Both catalysts are available from Degussa and have 5% w/w Pd on carbon.

A baseline hydrogenation was established using a stressed 6% loading of catalyst A for the untreated β-acids under normal conditions. It resulted in an incomplete hydrogenation with 22% yield of tetrahydrodesoxy-α-acids. As a comparison, the activated carbon treated β-acids were hydrogenated and the reaction was completed with >90% yield while the catalyst A loading was reduced to 4%. Further reduction of the catalyst A loading to 2% resulted in an incomplete reaction. However, a complete hydrogenation with 91% yield was achieved using 2% loading of the catalyst B. These experiments indicate that activated carbon effectively removes the catalyst poisons from the $CO_2$ precipitated β-acids. In conclusion, for the hydrogenation of β-acids, a normal 10% loading of catalyst A and 8% loading of the catalyst B was required for untreated β-acids. However, these loadings can be reduced to 4–6% for the catalyst A and 2–4% for the catalyst B when using β-acids treated according to the process of the present invention.

Following the same logic, the A/B-aqueous stream (containing α-acids) was also treated with activated carbon to see if there could be some benefits. Any residual amounts of hop oil, β-acids, and impurities would also be removed. Not only were the resulting iso-α-acids and ρ-iso-α-acids formed in higher purity, but also a 25–40% catalyst reduction was achieved for the hydrogenation of the resulting iso-α-acids to tetrahydroiso-α-acids. A high purity and good yield for the hydrogenation of the carbon treated iso-α-acids to tetrahydroiso-α-acids was achieved using 6% loading of either the catalyst A or the catalyst B while a low yield with incomplete hydrogenation was obtained using the untreated iso-α-acids. For completion, a 8–10% loading of the catalyst A was required for the untreated iso-α-acids.

We have demonstrated that activated carbon can absorb the catalyst poisons present in both the A/B aqueous stream and the C-aqueous stream on a laboratory scale. These results demonstrate a lower consumption of the catalyst while increasing the purity and yield of the products. The absence of poisons on the catalyst (or at least a lower amount of poisons) also facilitates the recycling of the catalyst. Silica gel, diatomaceous earth (for example, CELITE available from Celite America, Lompoc, Calif.), alumina, zeolite, etc. may also be effective for removing catalyst poisons. In 1990, the price of activated carbon was about $0.60/lb for virgin material. Meanwhile, regenerated product is about $0.50/lb including transportation costs of about $0.20/lb. (Chemical Engineering, page 75–78, November 1995). Overall, using activated carbon is more simple, effective, and inexpensive than other materials.

EXPERIMENTAL SECTION

1. The α- and β-Acids Separation

To 1000 g of a $CO_2$ hop extract (containing 37.38% α-acids and 42.53% β-acids) an aqueous solution containing 67.78 g of KOH and 2000 ml of water was added and agitated. Two phases were formed, an A-aqueous phase and an A-oil phase. They were then separated by gravity. In a subsequent extraction, the A-oil phase was re-extracted with an aqueous solution containing 5.6 g of KOH and 1330 ml of water. After the phase separation, it yielded a B-aqueous phase and a B-oil phase. A combination of A-aqueous and B-aqueous phases gave the A/B-aqueous stream (3700 ml). The B-oil phase was then extracted with an aqueous solution containing 64.37 g of KOH and 1250 ml of water. Two phases were formed and separated by gravity to produce the C-aqueous stream (1700 ml) and a C-oil phase (as the HOF). This separation process is shown schematically in FIG. 1.

2. Activated Carbon Treatment

Four activated carbons, Degussa catalyst support carbon, Alltech Filtrasorb 200, Nort C granular (Pfanstiehl Laboratories, Inc.), and Calgon were used. A typical example is described below.

Both A/B- and C-aqueous streams were split into two parts. One part of the A/B-aqueous stream (1850 ml) was agitated with 25 g of activated carbon for 1 hour and then filtered to remove the carbon. The other part served as a control and was not treated with the activated carbon. Both A/B-aqueous streams were isomerized to iso-α-acids.

Similarly, one part of the C-aqueous stream (1700 ml) was agitated with 20 g of the activated carbon for 1 hour and then filtered to remove the carbon. The other part was not treated with carbon and served as a control. Both C-aqueous streams were diluted with water and then purged with $CO_2$ gas to precipitate the β-acids. After filtration, white/light yellow solid β-acids were obtained.

It is preferred that 5–20% w/w activated carbon be used based on the amount of α- and/or β-acids to be treated.

3. Hydrogenation/Hydrogenolysis of β-Acids a. Untreated β-Acids 53.15 g of β-acids (94% pure) in an ethanolic solution (containing 250 ml of 95% ethanol and 5 ml of sulfuric acid) was hydrogenated with 3.54 g of the catalyst B (4% loading) under 10 psig of hydrogen for 2 hours. The reaction was maintained at 39° C. After work up, the resulted solution was analyzed by HPLC. HPLC analysis indicated an incomplete reaction (60% yield).

b. Treated β-Acids 50 g of the carbon treated β-acids was mixed with an ethanol solution (containing 250 ml of 95% ethanol, 5 ml of sulfuric acid) and 3.58 g of the catalyst B (4% loading). The mixture was hydrogenated under 10 psig of hydrogen and 39° C. for 2 hours. After work up, the obtained solution was analyzed by HPLC for tetrahydrodesoxy-α-acids. HPLC analysis indicated that the hydrogenation was complete with 91% yield.

4. Hydrogenation of Iso-α-acids to Tetrahydroiso-α-acids a. Untreated iso-α-Acids 55 g of iso-α-acids was mixed with 250 ml of 95% ethanol, 90 ml of water, 9 g of KOH and 19 g of $MgSO_4 \cdot 7H_2O$. The mixture was hydrogenated using 6 g of the catalyst A (6% loading) under 20 psig of hydrogen and 45° C. for 2 hours. After work up, the oil was analyzed by HPLC. HPLC indicated that the oil contained 70% tetrahydroiso-α-acids with incomplete products (dihydroiso-α-acids). The yield was 71%.

b. Treated iso-α-Acids 55 g of the carbon treated iso-α-acids was mixed with 250 ml of 95% ethanol, 90 ml of water, 9 g of KOH and 19 g of $MgSO_4 \cdot 7H_2O$. The mixture was hydrogenated employing 6 g of the catalyst A (6% loading) or the catalyst B under 20 psig of hydrogen and 45° C. for 2 hours. After work up, the oil was analyzed by HPLC. HPLC indicated that the oil contained 74% of tetrahydroiso-α-acids with no incomplete products. The yield was 84%.

Thus, it can be seen that the present invention provides a straightforward process for removing catalyst poisons from unsaturated organic compounds. It should be apparent to one skilled in the art that this process is widely applicable and that any adsorbent can be used as long as it is capable of adsorbing the catalyst poison. The claims should therefore be looked to in order to assess the full scope of the invention.

We claim:

1. A method for the removal of catalyst poisons from hop extracts comprising the steps of:

agitating an aqueous solution of the hop extracts in the presence of an adsorbent capable of adsorbing the catalyst poisons; and separating the adsorbent containing the cataly poisons from the aqueous solution of hop extracts.

2. The method of claim 1, wherein the hop extracts are β-acids.

3. The method of claim 1, wherein the hop extracts are α-acids.

4. The method of claim 2, wherein the adsorbent is selected from the group consisting of silica, diatomaceous earth, alumina, zeolite, and activated carbon.

5. The method of claim 4, wherein the adsorbent is activated carbon.

6. The method of claim 3, wherein the adsorbent is selected from the group consisting of silica, diatomaceous earth, alumina, zeolite, and activated carbon.

7. The method of claim 3, wherein the adsorbent is activated carbon.

8. The method of claim 2, further comprising the step of subjecting the purified β-acids to hydrogenation and hydrogenolysis to produce tetrahydrodesoxy-α-acids.

9. The method of claim 4, further comprising the step of subjecting the purified β-acids to hydrogenation and hydrogenolysis to produce tetrahydrodesoxy-α-acids.

10. The method of claim 5, further comprising the step of subjecting the purified β-acids to hydrogenation and hydrogenolysis to produce tetrahydrodesoxy-α-acids.

11. The method of claim 3, further comprising the steps of subjecting the purified α-acids to isomerization and hydrogenation to produce tetrahydroiso-α-acids.

12. The method of claim 6, further comprising the steps of subjecting the purified α-acids to isomerization and hydrogenation to produce tetrahydroiso-α-acids.

13. The method of claim 7, further comprising the steps of subjecting the purified α-acids to isomerization and hydrogenation to produce tetrahydroiso-α-acids.

* * * * *

UNITED STATES PATENT AND TRADEMARK OFFICE
CERTIFICATE OF CORRECTION

PATENT NO. : 5,917,093
DATED : June 29, 1999
INVENTOR(S) : Patrick L. Ting, et al.

It is certified that error appears in the above-identified patent and that said Letters Patent is hereby corrected as shown below:

At column 4, line 5 delete "absorb", insert --adsorb-- therefor.

At column 6, line 4 delete "cataly", insert --catalyst-- therefor.

Signed and Sealed this

Twenty-ninth Day of February, 2000

Attest:

Q. TODD DICKINSON

*Attesting Officer*  *Commissioner of Patents and Trademarks*